United States Patent [19]

Zekan et al.

[11] Patent Number: 5,255,179
[45] Date of Patent: Oct. 19, 1993

[54] SWITCHED MODE POWER SUPPLY FOR SINGLE-PHASE BOOST COMMERCIAL AC USERS IN THE RANGE OF 1 KW TO 10 KW

[76] Inventors: Boze N. Zekan, 11 Boese Court, St. Catharines, Ontario, Canada, L2N 7E7; Luciano Dellasmirra, 40 Sumbler Road, Welland, Ontario, Canada, L3C 3N9

[21] Appl. No.: 723,029

[22] Filed: Jun. 28, 1991

Related U.S. Application Data

[63] Continuation-in-part of Ser. No. 555,710, Jul. 23, 1990, abandoned.

[51] Int. Cl.⁵ .......................................... H02M 3/337
[52] U.S. Cl. ..................................... 363/133; 363/25; 363/139; 307/10.1; 307/151
[58] Field of Search .................. 363/8, 63, 65, 71, 96, 363/135, 139, 131, 133, 24, 25; 307/9.1, 10.1, 150, 151

[56] References Cited

U.S. PATENT DOCUMENTS

| | | | |
|---|---|---|---|
| 3,416,062 | 12/1968 | Bernhard et al. | 363/40 |
| 3,586,868 | 6/1971 | Martens et al. | 307/10.1 |
| 3,655,991 | 4/1972 | Schneider | 307/10.1 |
| 3,681,611 | 5/1972 | Watson | 307/10.1 |
| 3,794,906 | 2/1974 | Hoffman, Jr. et al. | 363/8 |
| 3,824,404 | 7/1974 | Ghere | 307/10.1 |
| 4,067,057 | 1/1978 | Taddeo et al. | 363/41 |
| 4,074,145 | 2/1978 | Laffoon et al. | 307/10.1 |
| 4,150,424 | 4/1979 | Nuechterlein | 363/26 |
| 4,159,515 | 6/1979 | Walkowiak | 363/96 |
| 4,240,134 | 12/1980 | Nakazawa et al. | 363/21 |
| 4,453,205 | 6/1984 | Brakus | 363/8 |
| 4,480,297 | 10/1984 | Chetty et al. | 363/26 |
| 4,542,440 | 9/1985 | Chetty et al. | 361/111 |
| 4,656,570 | 4/1987 | Swoboda | 363/26 |
| 4,660,137 | 4/1987 | Hotaka | 363/56 |
| 4,706,178 | 11/1987 | Hayashi | 363/98 |

*Primary Examiner*—Emanuel T. Voeltz
*Attorney, Agent, or Firm*—Jeffrey T. Imai; Arne I. Fors

[57] ABSTRACT

A DC to AC power converter is disclosed which is connectable to a DC source, and including a first and second pair of switches which converts the DC source directly to AC by alternately switching between each of the first pair of switches at high frequency modulation, and between second pairs of switches alternately switching at each of the half cycles of the low frequency fundamental output voltage, for producing a positive pulse train and a negative pulse train. A transformer boosts the source voltage to the desired high voltage of the output of the converter circuit. A filter is connectable to an AC load and having a plurality of damping modes for extracting fundamental frequency from the output of the transformer, and having a control responsive to a signal for switching between damping modes. A sine wave oscillator generates a sine wave at the fundamental frequency. Feedback circuits maintain the AC output at the fundamental frequency.

17 Claims, 4 Drawing Sheets

Figure 1

Figure 2: H.V.Stage

SWITCHED MODE POWER SUPPLY FOR SINGLE-PHASE BOOST COMMERCIAL AC USERS IN THE RANGE OF 1 KW TO 10 KW

This application is a continuation in part of application Ser. No. 555,710 filed Jul. 23, 1990 (now abandoned).

FIELD OF INVENTION

This invention relates to a SWITCH MODE POWER SUPPLY TO PRODUCE A REGULATED AC OR DC OUTPUT FROM AN UNREGULATED DC SOURCE.

BACKGROUND OF INVENTION

The engine on a vehicle drives an alternator which generates an unregulated alternating current (AC) which is rectified to provide a direct current (DC) power source which is used to recharge the battery which is necessary to start the engine and also maintain the electrical systems which are used on the vehicle.

The alternating current (AC) of the alternator is passed through a rectifying circuit, normally a bridge rectifier or a half bridge rectifier in order to produce a DC power source. With constant excitation the alternator will produce an AC voltage which is proportional to the speed of the engine. Further, the AC voltage will have a frequency which is directly dependent upon the speed of the engine. In this unregulated form, i.e. without a fixed frequency, the output of the alternator is unsuitable for powering AC devices which are normally available for household use. In particular, such AC source is unsuitable to power sensitive instruments or devices such as computers or other electronic devices which require a constant frequency and voltage, normally 60 Hz at 120 Volts AC.

In remote areas or construction sites, the only available source of power may be a vehicle. Therefore, it would be desirable if the vehicle engine could be used as a source to operate power hand tools or operate electronic equipment.

To produce a regulated AC supply from existing technology, devices generally comprise a first stage which produces a DC voltage in excess of a desired AC peak voltage. The second stage of the standard technology involves an inverter circuit fed by the DC voltage source. Since the output requires a smooth sine wave generation, a high frequency converter mode is required. Transistor switching has been found to be the only acceptable method for such high frequency switching. However, it has been found that since the desired output AC voltage is 120 volts AC, the stress on such switching components for such components to operate is at the upper limit. The result is that the switching transistors produce a considerable voltage drop at higher voltages and accordingly become very inefficient.

Further, the existing technology generally utilises transistor switching devices in series with the load increasing the voltage drop and thereby resulting in poor control capability of the load.

SUMMARY OF THE INVENTION

The disadvantages of the prior art may be overcome by providing a direct converter combining a high frequency switch mode to boost the voltage to the desired voltage level and at the same time modulating the converter to produce a direct sinusoidal output at the load.

It is an object of the invention to provide a 115 Volt nominal regulated sinusoidal AC power supply from an unregulated DC source which has a size and weight suitable for installation on small vehicles.

It is a further object of the invention to provide an AC power supply which can be used for a wide range of loads for a power tool application where the power factor is between 0.4 lagging and 1.

It is further object of this invention to have an AC power supply which is switchable between an AC supply and a DC supply to be able to utilize the high voltage DC power.

According to one aspect of the invention there is provided a DC to AC power converter, comprising a converter circuit connectable to a DC source, and including a plurality of switch means which converts the DC source to AC by alternately switching between the switch means. A transformer means is provided for transforming the output of the converter circuit. A filter means is provided which is connectable to an AC output and having a plurality of damping modes for extracting a fundamental frequency from the output of the transformer means. A sine wave oscillator is provided for generating a sine wave at the fundamental frequency. Feedback means is provided for switching the filter means between damping modes after comparing the output of the filter means with the sine wave to maintain the AC output at the fundamental frequency.

DESCRIPTION OF DRAWINGS

In drawings which illustrate embodiments of the invention.

Note that in the drawings the (.) convention is used to illustrate a current entering the dotted end of a winding and sets up a positive flux in the winding.

DETAILED DESCRIPTION OF THE PREFERRED EMBODIMENT

The preferred embodiment generally comprises a first stage for converting the unregulated low voltage DC source directly to a high voltage pulse width modulated (PWM) representation of a sinusoidal alternating current, without going through the switching of high frequency, high voltage DC rail. The second stage filters the PWM sinusoidal representation, compensates the load impedance in order to produce a constant sinusoidal current and voltage output at the load.

Figure 1:
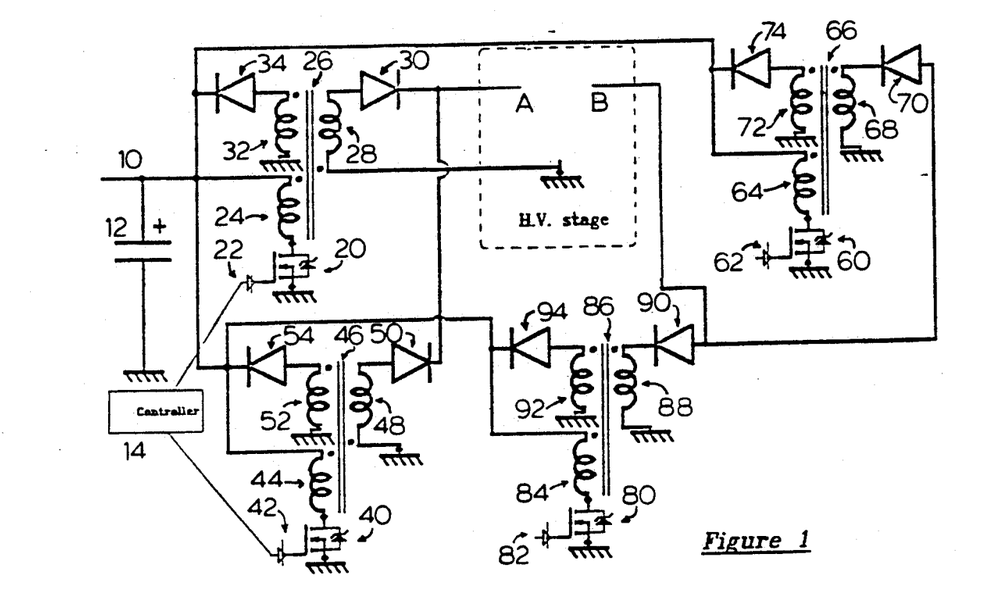
FIG. 1 is a circuit diagram of the low voltage stage of the preferred embodiment.

With reference to FIG. 1, a circuit diagram is illustrated representing the first stage of this dual ended power supply.

An unregulated DC voltage supply 10 is applied across storage capacitor 12 with the polarity indicated. DC source 10 may be obtained by rectifying with an unregulated commercial bridge circuit, for example, the output of an automotive alternator (not illustrated).

Capacitor 12 is connected between voltage supply 10 and ground. The positive side of capacitor 12 is connected to one end of primary winding 24 of transformer 26. The other end of winding 24 is connected to a switch means MOSFET 20 which in turn is connected to ground. MOSFET 20 is switched between its on and off state by driver 22 which is responsive to signals generated by controller 14.

The positive side of capacitor 12 is also connected to diode 34 which in turn is connected to one side of reset winding 32 of transformer 26. The opposite end of reset winding 32 is connected to ground.

Transformer 26 has two primary windings, namely primary winding 24 and reset winding 32. On the secondary side of the transformer is secondary winding 28 which has one end connected to ground and the other end flowing to point A through diode 30.

The primary side of transformer 26 must be wired and wound in such a manner that when MOSFET 20 is switched to its on state allowing current to flow from DC source 10 to ground by primary winding 24, a positive voltage with respect to ground will be induced in secondary winding 28. When MOSFET 20 is ordered to its off state a path will be provided by reset winding 32 and diode 34 to allow the flux of the transformer 26 to be reduced to zero. Diode 34 permits current to flow only in the direction illustrated to permit the flux to be reset. Similarly for the secondary of transformer 26, diode 30 has a polarity to restrict the flow of current in the direction illustrated.

Transformer 46 is wired in an identical fashion as with transformer 26. The DC source 10 has a path to primary winding 44 then through MOSFET 40 and then to ground. MOSFET 40 is driven by driver 42 which switches MOSFET 40 between its on and off states. Transformer 46 has a flux resetting path via reset winding 52 connected to diode 54 which in turn is connected to DC source 10. On the secondary side of transformer 46, secondary winding 48 is connected between ground and point A having diode 50 to restrict the flow of current in the desired direction as shown.

Transformers 26 and 46 are referred to as the positive cycle portion of the circuit and operate only during the generation of a positive voltage.

Transformers 66 and 86 operate only during the generation of a negative voltage. Transformers 66 and 86 are identical to transformers 26 and 46.

Transformer 66 has a primary winding 64 connected to a MOSFET 60 connected to ground. Driver 62 which is responsive to signals from controller 14 and switches MOSFET 60 between its on and off state.

Transformer 66 is also provided with reset winding 72 and diode 74. On the secondary side of transformer 66 is provided secondary winding 68 and diode 70.

In a similar fashion transformer 86 has primary winding 84 connected to MOSFET 80 connected to ground. MOSFET 80 is driven by driver 82 which is responsive to signals from controller 14 for switching MOSFET 80 between its on and off state. Transformer 86 has a reset winding 92 connected between ground and diode 94. On the secondary side of transformer 86 is secondary winding 88 and diode 90.

Transformers 66 and 86 are wired in identical manner as transformers 26 and 46 with the exception that secondary of transformers 66 and 86 have a polarity opposite that of the secondary of transformers 26 and 46. The secondary of transformers 66 and 86 accordingly produce a negative voltage at point B with respect to ground.

Figure 2:
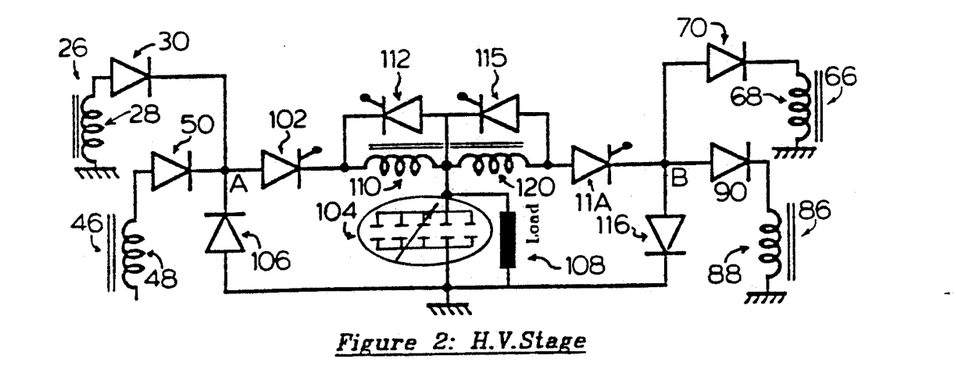
FIG. 2 is a circuit diagram of a high voltage stage of the preferred embodiment.

With reference to FIG. 2, the high voltage stage circuit, corresponding to the dual ended low voltage stage, is illustrated including the secondary windings of transformers 26, 46, 66 and 86 up to point A and B respectively.

Point A is connected to Silicon Controlled Rectifier (SCR) 102 and then connected in parallel to one side of load 108 through inductor 110. SCR 112 provides a switchable short circuit path across inductor 110. Capacitor 104 is connected across load 108. Point A is negatively clamped to ground via diode 106.

Point B is connected to load 108 and capacitor 104 in the same manner as the connections between point A, with the exception that all elements are connected with a reverse polarity. Point B is connected through SCR 114 which in turn is connected to inductor 120. Inductor 120 is connected in parallel to SCR 115 to provide a switchable short circuit path. A positive clamping path is provided between ground and point B via diode 116.

In FIG. 2, capacitor 104 is illustrated as a single capacitor. In the preferred embodiment, capacitor 104 is a bank of capacitors in parallel having a control means to switch between banks of capacitors. The switching may be a triac or relay which is responsive to a signal generated by the comparator. The operation of the control circuit is discussed below. Capacitor 104 will switch capacitor elements into or out of the circuit to increase or decrease the total amount of capacitance.

The output of the first stage is a pulse train or a succession of short width modulated pulses. Each transformer 26, 46 provides a positive pulse width modulated voltage, and each transformer 66, 86 provides a negative pulse width modulated voltage to the high voltage stage between points A and B. The pulses are divided into positive groups and negative groups. Each group is active for only one half of a cycle at the fundamental frequency.

The positive group will alternate pulses between transformers 26 and 46, allowing each coil to reset its flux while the other conducts. The negative group will similarly alternate negative pulses between transformers 66 and 86.

In a typical positive cycle of the pulse train, MOSFET 20 is turned on and off by its driver 22 which is in turn enabled by controller 14. Current flows from DC source 10 to ground via primary winding 24 of transformer 26. Current through the primary winding 24 induces a secondary voltage in the secondary winding 28 allowing a current to flow through diode 30 to point A.

When controller 14 orders MOSFET 20 to an off state, the ferrite transformer core 26 resets its flux via diode 34. A current will flow through reset winding 32 in a direction such as to oppose the flux set up by primary winding 24. This current flow will cause the flux of transformer 26 to be reset.

At the same time controller 14 may order MOSFET 40 to the on state, through its driver 42. Similarly current flows from DC source 10 to ground via primary winding 44 inducing a secondary voltage in the secondary winding 48 allowing a current to flow through diode 50 to point A.

When controller 14 turns MOSFET 40 off, the core flux of transformer 46 is reset by the regenerative current flowing through diode 54 via winding 52 from ground to DC source 10.

Controller 14 continues to switch MOSFET 20 and 40 alternatively and modulates the time between on and off states of each switch in such a way that the flux under the positive voltage appearing between point A and ground approximates a Pulse Width Modulation (PWM) sine wave.

Controller 14 will continue to alternately turn on and off MOSFET 20 and 40 for the desired period of time to achieve a half cycle for a fundamental frequency. At the end of the half cycle, controller 14 will cease to alternately switch on and off MOSFET 20 and 40. Controller 14 will then alternately switch MOSFET 60 and 80 by turning on and off the drivers 62 and 82 respectively. This will modulate the negative half cycle of the fundamental sine wave between point B and ground, using the same PWM technique. The process is then repeated between positive and negative groups.

Controller 14 utilizes a switching regulator which is commercially available as SG 2526 and configured to send out 20 micro second pulses alternately between two channels. The regulator compares an attenuated and rectified version of the output voltage to a rectified version of a stable 60 Hz sinusoidal reference. Whenever the instantaneous magnitude of the feedback voltage is less than the instantaneous magnitude of the reference voltage, the regulator will maintain the pulse in order to deliver more energy to the load, i.e., to increase the output voltage. When the instantaneous magnitude of the feedback voltage exceeds the instantaneous magnitude of the reference voltage, the regulator cuts short the 20 microsecond pulse, stopping the deliver of energy to the load, thereby causing the output voltage to drop. The controller 14 adjusts the output 833 times in a cycle to generate a positive pulse train and a negative pulse train which simulates a sinusoidal output.

In the same fashion as the positive cycle the flux of transformers 66 and 86 are reset when the respective MOSFET 60 and 80 are in the off state via diode 74 and 94 connected between reset winding 72 and 92 respectively and DC source 10.

The output of the first stage at point A and B with respect to ground is an alternating voltage alternating between a positive voltage pulse train and a negative voltage pulse train at a fundamental 60 Hz frequency which is desired at the output load.

In operation, the circuit connected from point A to ground operates during the positive half cycle. During the negative half cycle, the circuit connected between point B and ground operates.

With reference to FIG. 2 the details of the high voltage stage are now analyzed. During the positive cycle, SCR 102 is continuously triggered at a high frequency and acts as a closed relay. At the same time SCR 112 is not triggered and acts as an open circuit.

Current flows from point A through SCR 102 then through inductor 110 to charge capacitor 104 which energizes load 108.

When the primary current of transformers 26 and 46 are not being pulsed, that is at the end of the positive half cycle of the desired 60 Hz output voltage, or between pulses in the positive pulse train, the inductor 110 current flowing through SCR 102 and load 108 will freewheel via diode 106 since SCR 102 is still conducting. Inductor 110 serves as a filtering device for the high frequency voltage pulses charging up the capacitor 104.

SCR 112 is fired at the end of the positive cycle shorting inductor 110 and causing its stored flux to freewheel. SCR 102 will then see a negative voltage coming from capacitor 104 and thereby forcing it to the off state.

Since the load current no longer has a closed path from source to ground, the load current will have to freewheel through capacitor 104 causing its voltage to drop.

When the sinusoidal reference voltages begins its negative half cycle, the negative group is started up. SCR 114 is then fired continuously while the primary of transformers 66 and 86 are alternately switched to induce a negative voltage in the secondary windings 68 and 88. Diode 116 serves as a freewheeling path to the negative load current and current in inductor 120.

SCR 115 is fired at the end of the negative voltage half cycle providing a short circuit path for the stored flux in coil 120, causing a reverse voltage across SCR 114 to appear and causing it to turn off.

With reference to FIG. 2 and FIGS. 5 the operation of a circuit will now be described, showing how a sine wave output is created when various loads are present.

Figure 5A:
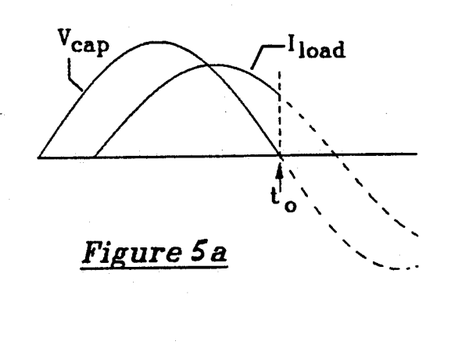

When the output voltage of capacitor 104 becomes zero, coming from a positive value, the inductive load current will still have a large magnitude. FIG. 5a illustrates the wave forms at that instant.

At the instant SCR 112 is fired, the inductor current is diverted from feeding SCR 102, and hence causing SCR 102 to turn off. At this time, the energy remaining in inductor 110 rapidly dissipates in the freewheeling path of SCR 112. The load current will then freewheel into capacitor 104.

There are three possible cases of response depending upon the relative capacitance values of capacitor 104 and the impedance of load 108.

Figure 5B:
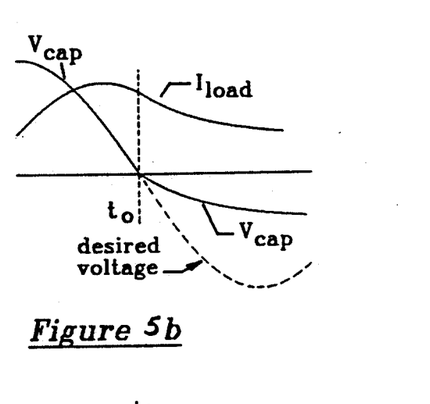

An exponential response will exist if the load inductance and the resistance constitute an overdamped circuit with capacitor 104. An exponential response has a slope lower than the desired sinusoidal output as shown in FIG. 5b.

Figure 5C:
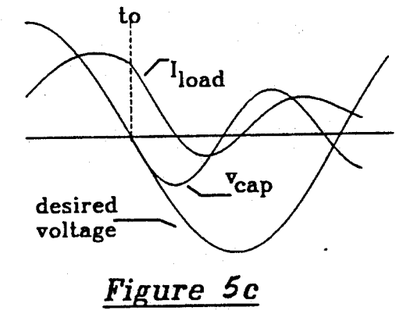
Figure 5D:
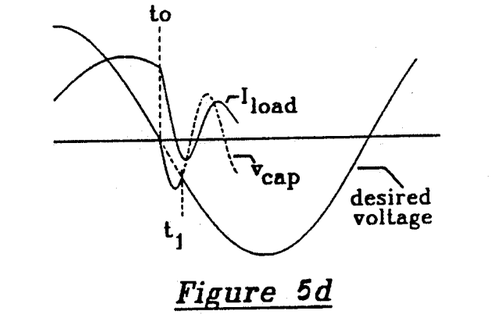

If the inductance and resistance of the load resonate with capacitor 104, an underdamped response either of FIGS. 5c or 5d exists. On FIG. 5c, the capacitor voltage is entirely contained within the desired sinusoidal voltage. In FIG. 5d, the capacitor voltage has a much higher slope than the desired sinusoidal voltage.

Normally capacitor 104 has a relatively small capacitance producing the more common response as illustrated in FIG. 5d.

If the response of FIG. 5d is obtained during the negative group, point B with respect to ground will not turn on until time T1 since the controller sees a voltage magnitude higher than the reference voltage. At instant T1, the controller takes over the capacitor voltage causing the load voltage to become again sinusoidal on a negative surging.

However, if there is enough capacitance in capacitor 104 to produce the response of FIG. 5c or 5b, the controller would immediately cause the negative group to regulate the output to be sinusoidal.

The control strategy is to switch capacitor elements in and out in capacitor bank 104. Each element is switched using natural commutated triacs or fast acting wet contact relays.

Since there are no problems associated with primary stresses for either of the responses for FIGS. 5b, 5c, or 5d, a control strategy is as follows:

During the second and third quarters of the sine wave i.e. the time from the positive peak to the negative peak, the difference between the desired and actual output waveforms are fed into an integrator 708. If this integration results in a positive value, an underdamped oscillation is assumed with initial slope in excess of the reference sine wave value as illustrated in FIG. 5d. The controller adds in a step of extra capacitance for the next cycle. This is repeated until the response of 5c is obtained, at which point sinusoidal voltage will be observed and no error will be detected.

Figure 5E:
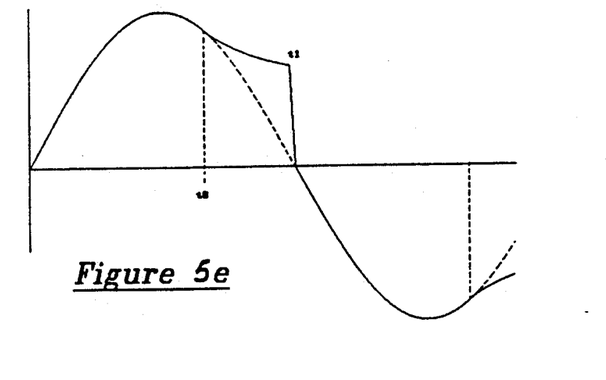

If the capacitance value for capacitor 104 is too high, the response of the positive cycle will look like FIG. 5e. After instant TO, the slope of the discharge of the capacitor 104 through load 108 becomes larger than the slope of the desired sine wave and the controller will stop firing the positive cycle, point A to ground.

This results in a distortion of the second quarter of the wave and can be readily detected as a negative integration output. This is interpreted by the controller and at the next cycle one capacitor bank is disabled. Lowering the capacitance one step at a time per cycle is performed until again the response of 5c is obtained and a sine wave produced within accepted tolerance.

Figure 6:
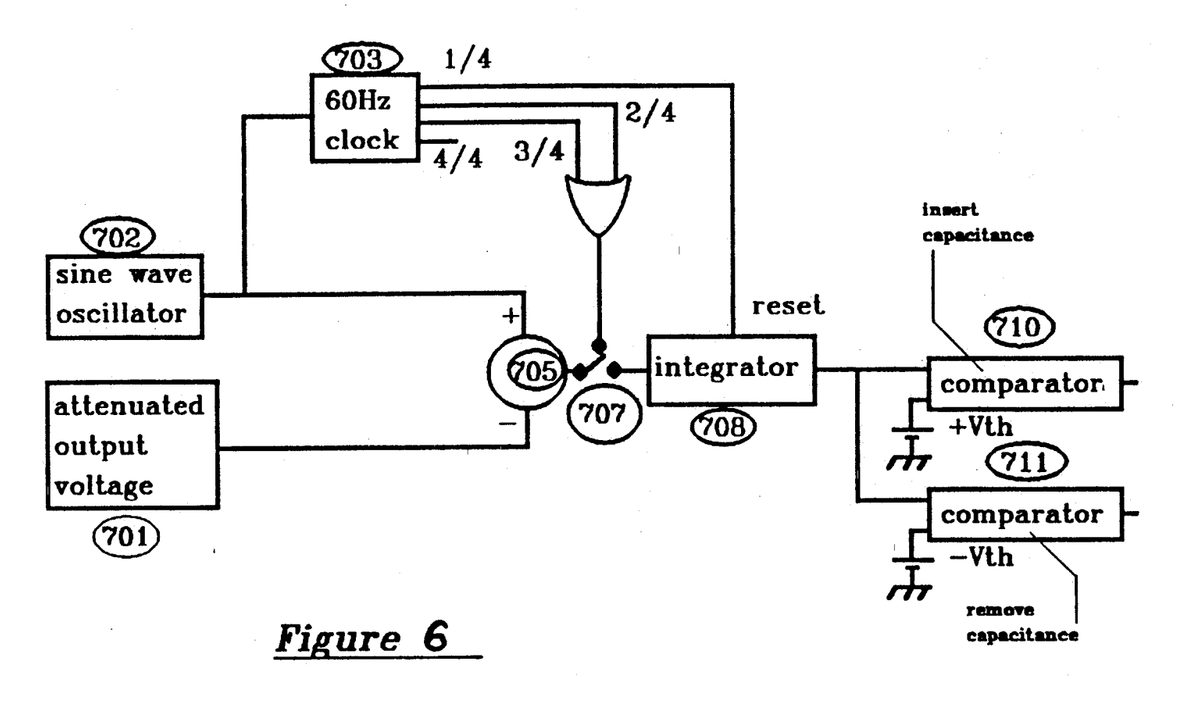
FIG. 6 is a block diagram of the reactive power compensating the feedback circuit.

With reference to FIG. 6 the control circuit of the reactive power compensation circuit is now described. A sine wave generator 702 generates a smooth sine wave at the fundamental frequency, corresponding to the image of the desired output voltage across the load. The output of the sine wave generator 702 triggers a synchronized 60 Hz clock circuit 703 which provides pulse outputs at each ¼ cycle of the sine wave. The output of the sine wave generator 702 is also fed into a differential operational amplifier circuit 705, along with an attenuated version of the output voltage 701. The output of this circuit, which represents the signed instantaneous error of the desired wave with the actual load wave shape, is fed into an integrator 708 via switch 707. This switch is selectively enabled/disabled by the circuit of 703. The integrator 708 output represents the error on the flux between the desired output and the actual output during the 2/4 and ¾ (i.e. from the positive peak, through zero and to the negative peak). This signal is fed into comparators 710 and 711. These comparators have individual thresholds, one set for too little capacitance, the other for too much capacitance value of capacitor 104. When the input of either comparator exceeds the preset threshold of error in the flux, the corresponding comparator output will go high, and cause the main controller to insert or remove a capacitor element in the bank 104.

Alternately, the differential operational amplifier circuit 705 may be removed and the output voltage 701 fed directly to switch 707. This scheme will act in the same manner with fewer components, at the expense of requiring perfect synchronization to start and stop the integrator precisely at the peaks of the wave, which is a very difficult operation to resolve.

In the preferred embodiment the chopping frequency at which MOSFET 20 and 40 and MOSFET 60 and 80 alternately switch is 25 kilohertz to produce an output frequency of 60 Hz. The preferred difference between the chopping frequency and fundamental frequency is at least 400 times.

Transformers 26, 46, 66 and 86 are ferrite transformers which allow a reduction in size of the magnetic components, both in weight and in volume as compared with conventional transformer. The ferrite transformers having a smaller magnetic component help to increase the power efficiency of the power supply.

The use of MOSFET 20, 40, 60 and 80 at low voltages enables the power to be expanded by parallelism without any special constraints. The use of the ferrite transformers connected in parallel (i.e. with primary windings in parallel and secondary winding in series) reduces current winding sizes while increasing output voltages and ultimately output power.

It is necessary to provide the special switching arrangement, SCR 102 and 112 and SCR 114 and 115 on the high voltage side in order to produce the alternating output voltage. Since these switching elements are used at frequencies in the 60 hertz range and are all naturally commutated, it is possible to use low cost thyristors and diodes.

In the preferred embodiment, inductors 110 and 120 are required for the circuit. In pure DC rectification in standard technology, this inductor is generally not required. However in AC, if inductors 110 and 120 are not present, the capacitance 104 reflected to the primary side will compensate for the transformer reactance and the net impedance seen by the primary switch is limited to the resistance of the wires. Hence peak current 20 to 30 times the admissible rating appear which rapidly destroy MOSFETS 20, 40, 60 and 80.

The values of impedances of inductor 110 and capacitor 104 combination must be calculated in such a way as to limit the primary switch current to within the ratings of the MOSFET switches, as well as to provide good filtering of the high frequency carrier in order that 60 Hz fundamental output results.

Inductors 110 and 120 may be interphase reactors, tightly coupled or separate inductors. If interphase reactors are used this ensures that turning SCR 114 on, while some current may still flow via 102, will force the latter to turn off by forced commutation. This feature is used to avoid short circuit impedance to be reflected to the primary MOSFET switches during transitions between half cycle switching.

Figure 3:
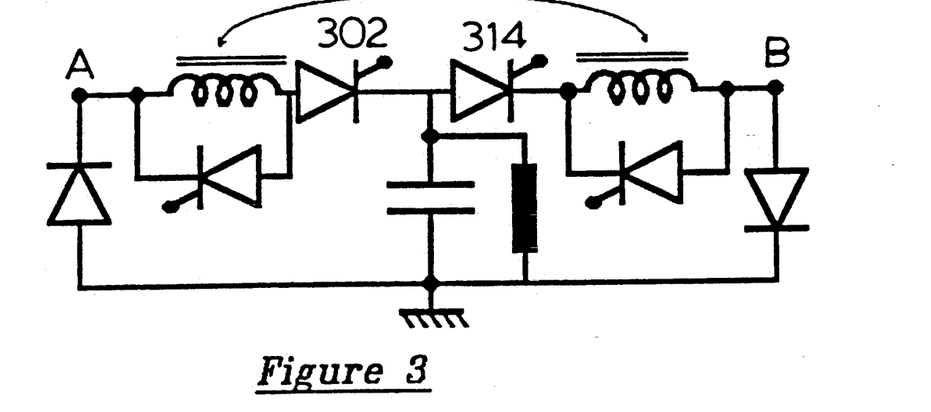
FIG. 3 is a circuit diagram of a second embodiment of a high voltage stage.

With reference to FIG. 3 an alternate embodiment of the high voltage stage is disclosed. Inductors 110 and 120 may be ganged together as illustrated in the circuit diagram. Functionally the circuit is identical to that disclosed in FIG. 2. The disadvantages are that isolated windings must be used for the inductors on the same core. However, an advantage can be achieved because complimentary SCR pairs 302 and 314 may be used.

Figure 4:
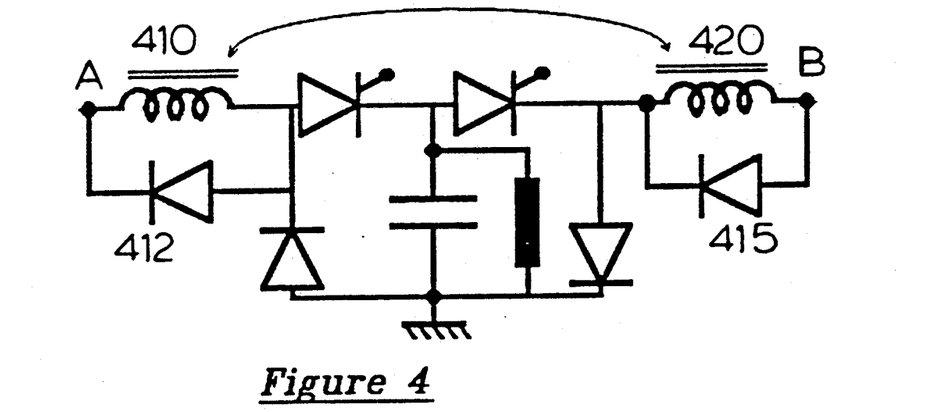
FIG. 4 is a circuit diagram of a third embodiment of the high voltage stage, FIG. 5 are graphs illustrating the wave forms at the load of the preferred embodiment.

With reference to FIG. 4, an other alternate embodiment of the high voltage stage is disclosed. In this embodiment, SCR 112 and 115 are replaced with diodes 412 and 415 respectively. Although this circuit functions in the manner described above, the energy stored in inductors 410 and 420 is dissipated through the diodes between pulses, instead of being transferred to capacitor 104 or the load 108. As a result, the efficiency of the circuit is reduced.

If AC loads having a magnetic circuit are to be fed by the power supply of the preferred embodiment, there must be no DC flux component on the load output. It has been found that although the low frequency components are well balanced, some higher frequency components may fluctuate and cause a DC drift in the output. A flux equalizer circuit may be added to the standard power controller.

A flux equalizer may be obtained by using a low pass filter to extract the DC drift of the output voltage. The DC drift can now be conditioned and used as an offset feedback which is added to the output of sine wave oscillator 702 to produce a DC bias correcting the sine wave reference.

This method prevents magnetic circuits from saturating even when random starts cause magnetic circuits to be energized at any point during the AC cycle, and hence, normally would cause initial flux imbalance. The controller will correct this DC offset flux imbalance in a few cycles and the load will not experience harmonic current due to core imbalance and therefore will become more efficient.

The preferred embodiment has a size and mass suitable for installation on a vehicle such as a pick-up truck, tractor or van. The output voltage peak could be sampled and used to signal a mechanical throttle control when the output demands cause the voltage to fall below an accepted limit from the 120 volts AC output to automatically throttle up the engine of the vehicle to which the unit is connected thereby increasing the output of the alternator and ultimately the output to maintain a constant output voltage. Conversely, when the output load is turned off, the integrator could trigger the mechanical throttle control to throttle down the car engine reducing the output voltage. Alternatively, if the engine speed is held constant, then the sampled peak output voltage could be used to control the alternator's field current. In response to a sampled peak output voltage, which is too low, the alternator's field current would be increased. As a result, the alternator output would be increased, which would ultimately allow for an increase in the output voltage.

The preferred embodiments may also be provided with a switch and a DC output. The switch would first switch between the AC output and the DC output and secondly would switch the controller 14 from an AC mode to a DC mode. Controller 14 would modulate the switching between MOSFET 20 and 40 and MOSFET 60 and 80 with a constant pulse width, rather than a sinusoidal modulation. Further, the DC output would be regulated by varying the width of the pulses.

While various changes may be made in detail or construction, it shall be understood that such changes shall be within the spirit and scope of the present invention.

We claim:

1. A DC to AC power converter, comprising:
 a converter circuit connectable to a low voltage DC source, and including a first and second pair of switch means for converting the DC source to an AC voltage by alternately switching between each switch means of the pair of switch means for producing a pulse train and by alternately switching between said first and second pairs of switch means, for producing a positive half cycle from the pulse train of the first pair of switch means and a negative half cycle from the pulse train of the second pair of switch means,
 a first pair of transformers for boosting the voltage of the positive half cycle and a second pair of transformers for boosting the voltage of the negative half cycle, each of said transformers having a unidirectional short path for resetting the flux of the core of the transformer whereby one transformer is resetting while the other of the pair is conducting,
 a filter means connected between an AC load and the first and second pair of transformers and having a plurality of damping modes for extracting a fundamental frequency from the output of the transformers, and having a control means responsive to a signal for switching between damping modes,
 a sine wave oscillator for generating a sine wave at the fundamental frequency, and
 feedback means for maintaining the AC at the fundamental frequency by comparing the output of the filter means with the sine wave and producing the signal, which signal is correlatable to the difference therebetween and sending the signal to the filter means.

2. A power converter as claimed in claim 1 wherein said feedback means includes
 an integrator circuit for measuring the flux of the output of the filter means and the flux of sine wave
 a comparator circuit for comparing the respective fluxes, and
 a control circuit responsive to the output of the comparator circuit for generating the signal for switching modes of the filter means correlatable to increase in damping when the flux of the output of the filter means exceeds that of the sine wave after a half cycle transition, and to decrease in damping when the flux of the output of the filter means exceeds the flux of the sine wave before a half cycle transition.

3. A power converter as claimed in claim 2 wherein said filter means comprises a first and second filter connected between the output of the first and second pairs of transformers and ground, and adapted for receiving the positive and negative half cycles of the AC respectively; said first and second filter each comprising in series
 a bank of capacitors connected in parallel and switchable therebetween responsive to the control means and having the AC load connected thereacross,
 an inductor having a switchable short circuit path thereacross for shorting the inductor during the opposite half cycle, and
 a filter switch means which is continuously triggered during the half cycle and off during the opposite half cycle, and having a unidirectional path from ground across the filter.

4. A power converter as claimed in claim 3 wherein the first and second filters have a common bank of capacitors to each of said first and second filters.

5. A power converter as claimed in claim 4 wherein said bank of capacitors comprise a plurality of capacitors which are switched into and out of the first and second filter as the bank is successively switched.

6. A power converter as claimed in claim 5 wherein said inductors of said first and second filters are wound on a common core.

7. A power converter as claimed in claim 6 wherein said switchable short path includes an SCR and said filter switch means is an SCR.

8. A power converter as claimed in claim 5 wherein the switching of each switch means of a pair of switch means is at a chopping frequency and the switching between said first and second pair of switch means is at twice the fundamental frequency.

9. A power converter as claimed in claim 8 wherein the chopping frequency exceeds the fundamental frequency in the order at least 400 times.

10. A power converter as claimed in claim 9 wherein the chopping frequency equals or exceeds 25 kilohertz.

11. A power converter as claimed in claim 10 wherein the fundamental frequency is less than or equal to 60 hertz.

12. A power converter as claimed in claim 11 wherein said unidirectional path to ground for resetting the flux of the core of the transformer comprises a second primary winding on each of the transformers connected between the DC source and ground and having a diode for restricting the flow of current away from ground.

13. A power converter as claimed in claim 12 wherein said switch means are MOSFETS having a controller for switching the MOSFET between an on and off state, said controller including a regulator responsive to the instantaneous difference between an attenuated output voltage and an attenuated sine wave voltage for regulating the time in which the switch is in the on or off state.

14. A power converter as claimed in claim 13 wherein said transformers are ferrite transformers.

15. A power converter as claimed in claim 14 wherein said converter is connected to an unregulated rectified output of an AC alternator of a vehicle.

16. A power converter as claimed in claim 15 wherein said converter further includes a throttle control means responsive to variations in the output load for regulating the speed of the engine of the vehicle.

17. A power converter as claimed in claim 16 wherein said controller switches said first and second pair of switches at a constant pulse width for producing a constant high DC positive voltage or negative voltage, respectively.

* * * * *